(12) United States Patent
DeGruchy et al.

(10) Patent No.: US 8,339,676 B2
(45) Date of Patent: Dec. 25, 2012

(54) METHODS, SYSTEMS AND APPARATUS TO COMPENSATE FOR DISTORTIONS CAUSED BY FUSING

(75) Inventors: Paul J. DeGruchy, Hilton, NY (US); Martin E. Banton, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 528 days.

(21) Appl. No.: 12/276,555

(22) Filed: Nov. 24, 2008

(65) Prior Publication Data

US 2010/0128317 A1 May 27, 2010

(51) Int. Cl.
*H04N 1/407* (2006.01)

(52) U.S. Cl. ............ 358/3.26; 358/1.9; 399/45; 399/67; 399/122; 399/320

(58) Field of Classification Search ........................ None
See application file for complete search history.

(56) References Cited

U.S. PATENT DOCUMENTS

| | | | | |
|---|---|---|---|---|
| 6,005,670 | A * | 12/1999 | Coleman | 358/1.9 |
| 6,339,692 | B2 * | 1/2002 | Yoshida et al. | 399/384 |
| 6,390,583 | B1 * | 5/2002 | Kato et al. | 347/15 |
| 6,529,643 | B1 * | 3/2003 | Loce et al. | 382/300 |
| 6,640,010 | B2 * | 10/2003 | Seeger et al. | 382/229 |
| 6,667,756 | B2 * | 12/2003 | Conrow et al. | 347/248 |
| 6,806,896 | B2 * | 10/2004 | Conrow et al. | 347/248 |
| 6,814,004 | B2 | 11/2004 | Loftus et al. | |
| 6,940,536 | B2 | 9/2005 | Rauch et al. | |
| 7,170,543 | B2 * | 1/2007 | Yamada et al. | 347/237 |
| 7,352,979 | B2 * | 4/2008 | Funabiki et al. | 399/68 |
| 7,970,301 | B2 * | 6/2011 | DeGruchy | 399/45 |
| 2003/0179830 | A1 * | 9/2003 | Eidson et al. | 375/296 |
| 2004/0086288 | A1 * | 5/2004 | Wibbels | 399/45 |
| 2005/0158062 | A1 * | 7/2005 | Yamada et al. | 399/45 |
| 2006/0034631 | A1 * | 2/2006 | Lofthus et al. | 399/84 |
| 2006/0072939 | A1 * | 4/2006 | Kremer et al. | 399/130 |
| 2006/0154161 | A1 | 7/2006 | Qi et al. | |
| 2007/0085265 | A1 | 4/2007 | DeJong et al. | |
| 2007/0139715 | A1 * | 6/2007 | Kazama et al. | 358/3.07 |
| 2008/0089710 | A1 | 4/2008 | Loftus et al. | |

FOREIGN PATENT DOCUMENTS

JP 2005-181673 * 7/2005

OTHER PUBLICATIONS

U.S. Appl. No. 11/800,748, filed May 7, 2007, Ellery Wong.
U.S. Appl. No. 11/800,733, filed May 7, 2007, Ellery Wong.
U.S. Appl. No. 12/194,958, filed Aug. 20, 2008, Kulkarni et al.
U.S. Appl. No. 12/059,170, filed Mar. 21, 2008, Michael Mongeon.

* cited by examiner

*Primary Examiner* — Dung Tran
(74) *Attorney, Agent, or Firm* — Fay Sharpe LLP (57) ABSTRACT

This disclosure provides printing methods, systems and apparatus to compensate for distortions by fusing toner applied to a media substrate. According to one exemplary method, image data is processed according to media characterization data for a toner density value associated with the image. The processed image data compensates for media substrate distortions due to fusing of a printed image on the media substrate.

23 Claims, 11 Drawing Sheets

METHODS, SYSTEMS AND APPARATUS TO COMPENSATE FOR DISTORTIONS CAUSED BY FUSING

CROSS REFERENCE TO RELATED PATENTS AND APPLICATIONS

U.S. patent application Ser. No. 12/275,648, filed Nov. 21, 2008, by Paul DeGruchy, entitled "METHODS, APPARATUS AND SYSTEMS TO COMPENSATE FOR DISTORTIONS CAUSED BY FUSING" is incorporated herein by reference in its entirety.

BACKGROUND

This disclosure provides printing methods, systems and apparatus to compensate for distortions by fusing toner applied to a media substrate. According to one exemplary method, image data is processed according to media characterization data for a toner density value associated with the image. The processed image data is used to generate a compensation for media substrate distortions due to fusing of a printed image on the media substrate.

Electrophotographic marking is a well-known and commonly used method of copying or printing documents. In general, electrophotographic marking employs a charge-retentive, photosensitive surface, known as a photoreceptor, that is initially charged uniformly. In an exposure step, a light image representation of a desired output focused on the photoreceptor discharges specific areas of the surface to create a latent image. In a development step, toner particles are applied to the latent image, forming a toner or developed image. This developed image on the photoreceptor is then transferred to a print sheet on which the desired print or copy is fixed.

The electrophotographic marking process outlined above can be used to produce color as well as black and white (monochrome) images. Generally, color images are produced by repeating the electrophotographic marking process to print two or more different image layers or color image separations in superimposed registration on a single print sheet. This process may be accomplished by using a single exposure device, e.g. a raster output scanner (ROS), where each subsequent image layer is formed on a subsequent pass of the photoreceptor (multiple pass) or by employing multiple exposure devices, each writing a different image layer, during a single revolution of the photoreceptor (single pass). While multiple pass systems require less hardware and are generally easier to implement than single pass systems, single pass systems provide much greater print speeds.

In generating color images, the ability to achieve precise registration of the image layers is necessary to obtain printed image structures that are free of undesirable color fringes and other registration errors. In addition, when generating duplex printed documents, registration of images on a document is important where individual sheets or pages are bound. For example, in duplex printing of sheets or pages intended for binding, in order to provide a quality print job which is competitive in the market place, it is necessary that the print on both sides of the pages be registered or positioned on the page such that there is no noticeable variation to the reader of the print on the page from the first to the second side. It has been found that variations of 2 mm or less in the image registration from Side 1 to Side 2 of a sheet or page are quite noticeable to the eye of the reader and give the impression of a poor quality print job. Accordingly, it has been found necessary to maintain very tight control of the image magnification or registration in duplex printing from Side 1 to Side 2, or front to back, of the printed media sheet.

Maintaining the aforesaid tight control of print magnification from Side 1 to Side 2 in a duplex printing job on an electrostatic photocopier has proven to be difficult and costly in such machines set up for high speed duplex printing. This has been found to be the case irrespective of whether the digital image is transferred directly to the electrostatic printing machine such as from a computer or is generated from a printed sheet inputted for copying and reproduction. The complexity of the processes within the electrostatic print engine including the transport of the paper through the sheet path and heat fusing in the print engine has introduced error in the print magnification and registration from Side 1 to Side 2 on a printed sheet.

One cause of misregistration of printed images on a xerographic printer is that paper media gets distorted as it passes through a fuser. Accordingly, it is desirable to have methods, apparatus and systems to compensate for distortions caused by fusing.

INCORPORATION BY REFERENCE

U.S. Pat. No. 6,529,643, issued Mar. 4, 2008, to Loce et al., entitled "SYSTEM FOR ELECTRONIC COMPENSATION OF BEAM SCAN TRAJECTORY DISTORTION";

U.S. Pat. No. 6,940,536, issued Sep. 6, 2005, to Rauch et al., entitled "SYSTEM ARCHITECTURE FOR SCAN LINE NON-LINEARITY COMPENSATION IN A ROS SYSTEM";

U.S. Pat. No. 6,667,756, issued Dec. 23, 2003, to Conrow et al., entitled "METHOD OF SHIFTING AN IMAGE OR PAPER TO REDUCE SHOW THROUGH IN DUPLEX PRINTING";

U.S. Pat. No. 6,806,896, issued Oct. 19, 2004, to Conrow et al., entitled "METHOD OF SHIFTING AN IMAGE OR PAPER TO REDUCE SHOW THROUGH IN DUPLEX PRINTING";

U.S. Pat. No. 6,814,004, issued Nov. 9, 2004, to Loftus et al., entitled "FACE-TO-FACE PRINTING WITHIN BOOKLET";

U.S. Patent Publication No. 2008/0089710, published Apr. 17, 2008, to Loftus et al., entitled "FACE-TO-FACE PRINTING WITHIN BOOKLET";

U.S. Patent Publication No. 2006/0154161, Published Jul. 13, 2006, to Qi et al., entitled "CROSSLINKED SILOXANE OUTMOST LAYER HAVING AROMATIC SILICON CONTAINING COMPOUNDS FOR PHOTORECEPTOR";

U.S. Patent Publication No. 2007/0085265, published Apr. 19, 2007, to DeJong et al., entitled "DUPLEX REGISTRATION ON SYSTEMS AND METHODS";

U.S. patent application Ser. No. 11/800,748, filed May 7, 2007, by Ellery Wong, entitled "METHOD OF ADJUSTMENT CONTROL FOR IMAGE ALIGNMENT";

U.S. patent application Ser. No. 11/800,733, filed May 7, 2007, to Ellery Wong, entitled "IMAGE ADJUSTMENT CONTROL FOR IMAGE ALIGNMENT";

U.S. patent application Ser. No. 12/194,958, filed Aug. 20, 2008, to Kulkarni et al., entitled "METHOD TO IMPROVE IMAGE ON PAPER REGISTRATION MEASUREMENTS"; and U.S. patent application Ser. No. 12/059,170, filed Mar. 31, 2008, to Michael Mongeon, entitled "METHOD AND APPARATUS FOR IMAGE REGISTRATION FOR IMAGE PROCESSING";

are incorporated totally herein by reference in their entirety.

BRIEF DESCRIPTION

In one embodiment of this disclosure, disclosed is a method of printing an image that compensates for distortions caused by fusing toner applied to a media substrate which comprises A) receiving image data representing an image for printing on a printing device, the printing device including an image transfer point and a fuser; B) assigning a toner density value associated with printing the image on the printing device, the toner density value one of a plurality of values, associating a plurality of possible toner densities necessary to print the image on the media substrate; C) accessing media characterization data, the media characterization data including media shrinkage data associated with the fusing of toner for a plurality of toner density values; D) processing the image data according to the media characterization data for the assigned toner density value to compensate for media substrate shrinkage due to fusing the printed image on the media substrate; E) printing the image on the media substrate at the image transfer point using the processed image data; and F) fusing the printed image on the media substrate.

In another embodiment of this disclosure, a computer program product is disclosed. The computer program product comprises a computer-usable data carrier storing instructions that, when executed by a computer, cause the computer to perform a method of processing an image that compensates for distortion caused by fusing toner applied to a media substrate comprising A) receiving image data representing an image for printing on a printing device, the printing device including an image transfer point and a fuser; B) assigning a toner density value associated with printing the image on the printing device, the toner density value one of a plurality of values, associating a plurality of possible toner densities necessary to print the image on the media substrate; C) accessing media characterization data, the media characterization data including media shrinkage data associated with the fusing of toner for a plurality of toner density values; and D) processing the image data according to the media characterization data for the assigned toner density value to compensate for media substrate shrinkage due to fusing the printed image on the media substrate.

In still another embodiment of this disclosure, a printing system is disclosed which comprises a printing device including a fuser and an image transfer point, a controller operatively connected to the printing device, the controller configured to execute a method of printing an image that compensates for distortion caused by fusing toner applied to a media substrate comprising A) receiving image data representing an image for printing on the printing device, B) assigning a toner density value associated with printing the image on the printing device, the toner density value one of a plurality of values, associating a plurality of possible toner densities necessary to print the image on the media substrate; C) accessing media characterization data, the media characterization data including media shrinkage data associated with the fusing of toner for a plurality of toner density values; D) processing the image data according to the media characterization data for the assigned toner density value to compensate for media substrate shrinkage due to fusing the printed image on the media substrate; E) printing the image on the media substrate at the image transfer point using the processed image data; and F) fusing the printed image on the media substrate.

DETAILED DESCRIPTION

As briefly discussed in the background section, the registration of printed images on a document, i.e. media substrate or media, can be critical for color printing and duplex printing of documents which will be bound.

One cause of misregistration is paper media gets distorted as it passes through a fuser. This is largely seen as shrinkage caused from moisture being driven out of the media at high temperatures. Changes can also occur in the media due to the high nip strain that affects its mechanical properties. When side one is imaged and fused, then re-circulated for imaging side two, the sheet size has changed and therefore adversely affects the front to back registration. Also, the toner density within the image content of the page and between pages varies, causing the media distortion pattern to change significantly. Greater image density causes the distortion to increase and variation causes nonlinearity. With very tight registration goals, these variations in media distortion becomes very significant. Notably, image density variation within a document can change the mean media distortion by several hundred microns Some solutions to media distortion, for example shrinkage, include a printer setup procedure whereby x-y margin shift and image mag (magnification) can be adjusted independently for side one and side two to adjust IOP (image on paper). This may be accomplished by use of media property LUTs (look-up-tables) which try to center the mag error caused from the media shrinkage.

This disclosure and the embodiments thereof address IOP registration errors caused by media substrate distortion as a function of the toner density required to print an image.

Image content will vary toner density and area coverage significantly within an image and from page to page within a document. This can range anywhere from low density when printing text to very high density when printing pictures or graphics. This variation in toner density can cause the media distortion pattern to change significantly. Higher image density drives greater distortions and the density variation within the image causes the distortion to become more nonlinear. This disclosure and the exemplary embodiments described therein, provides methods, apparatus and systems of pre-characterizing the media distortion variation effects as a function of the amount of image density. The image density concentration pattern for each first side printed image is tracked and dynamic image distortion compensation algorithms are applied to the second side image through the use of a VCSEL (Vertical Cavity Surface-Emitting Laser) ROS to better place it on top of the actual first pass media distortion. By monitoring the image density content of the first side image and applying dynamic image compensation accordingly to the second side, several hundred microns of improved IOP registration may be achieved.

To facilitate a better understanding of the exemplary embodiments of this disclosure, a detailed description of the tests performed and problem are initially presented.

Figure 4:
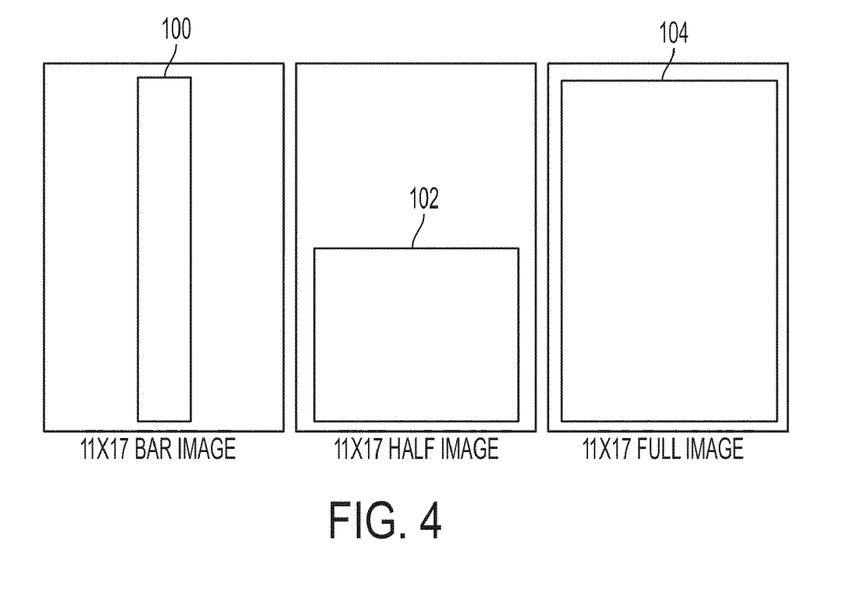
FIG. 4 is an illustration of a bar image, half image and full image used as exemplary test patterns according to this disclosure.

With reference to FIG. 4, four levels of area coverage with 100% black density were used for Image Density testing; none or No image (not shown), Bar image 100, Half image 102 and Full image 104. The following tests were conducted on a printer with a fuser. Image density testing performed used a Registration Test Pattern running away from transfer. This allowed for the printing of the image density patterns on the front side without overprinting over a dot test pattern provided to measure registration errors. By processing the inverted side 2 dot test patterns as a side 2 image, the image distortion profile simulates the same result as if it was run as a side 1 towards transfer.

The plots illustrated in FIGS. 5-8 are for a typical media run on the printer. The target was pre-printed using an ink jet printer as to preserve the original properties of the media. The test target was then scanned, run through the machine and immediately scanned again after exiting the printer. The difference between the two scans yields the media distortion resulting from the fuser. This distortion represents the image distortion that would be seen as front to back image registration error from fusing for a duplex print if no error corrections are applied.

Figure 5:
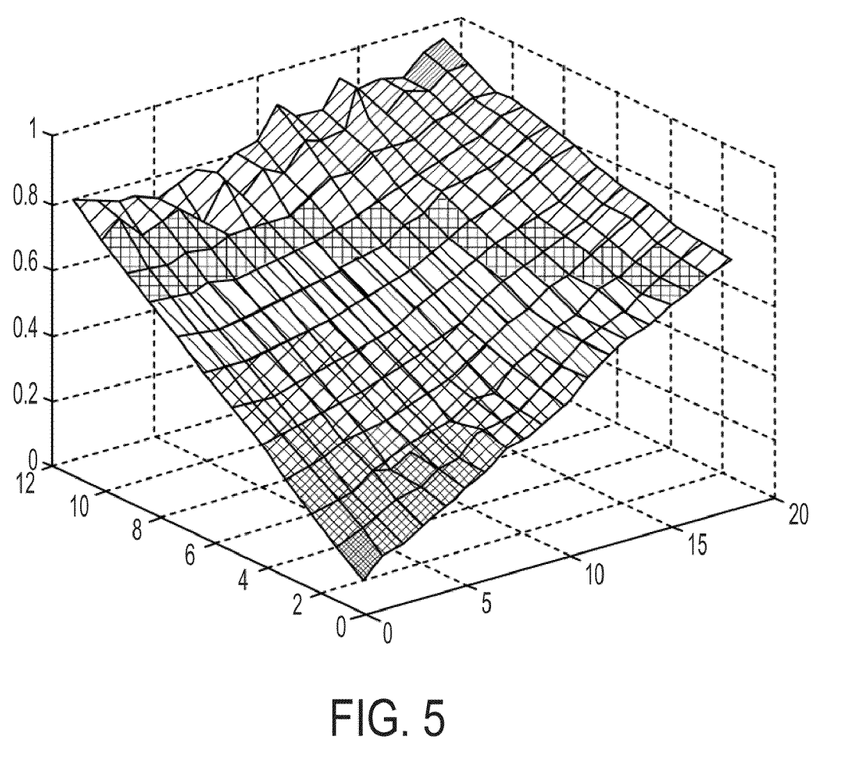
FIG. 5 is a graph of the media distortion associated with one type of media subsequent to a fusing process, wherein no image printed on the media substrate.

As can be seen in FIG. 5, the media shrinks considerably (almost 1 mm) from the first pass through the fuser. The side 2 image will therefore be transferred to a respectively smaller image that was previously printed on the front, resulting in front to back image registration error.

Notably, if a setup procedure is applied whereby a customer would run 5 to 10 duplex target prints using the job intended media and then scan and analyze the prints, image compensation parameters to correct for the total average errors can be calculated and applied to the print job through a VCSEL ROS. This setup procedure has the potential to reduce the fuser errors an order of magnitude as shown.

Figure 6:
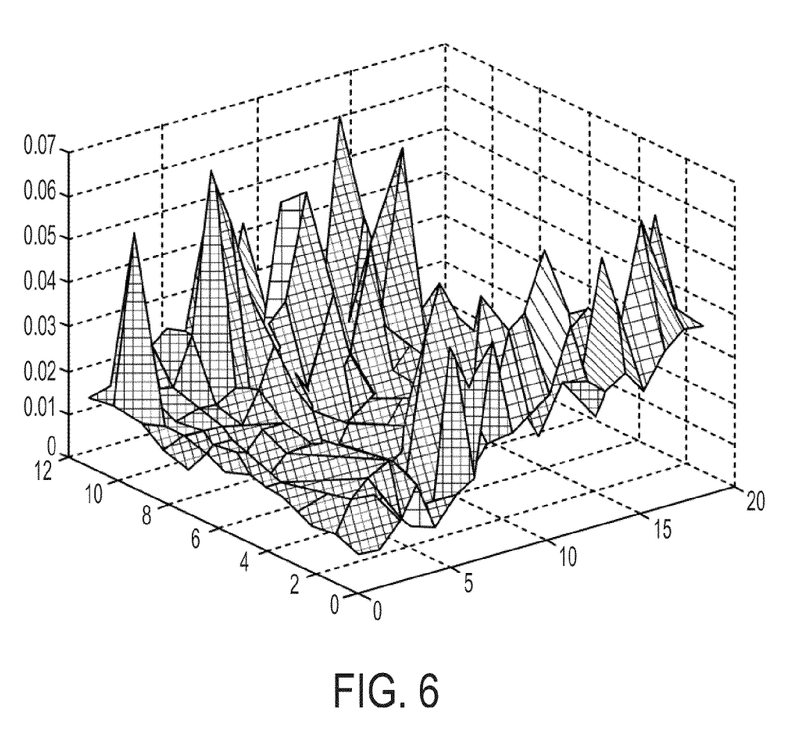
FIG. 6 is a graph of the typical media distortion of a low image density printed test image where the average linear and nonlinear associated with a no image test pattern is removed.

With reference to FIG. 6, illustrated is typical low image density media distortion after removing average linear and nonlinear errors. The corrections were based on no image applied to the front of the $2^{nd}$ side of the test target. These corrections are properly applied to images with very low toner density, but as the amount of toner density changes throughout the document, the applied error corrections go out of sync with the actual changes in the media distortion caused from fusing.

Figure 7:
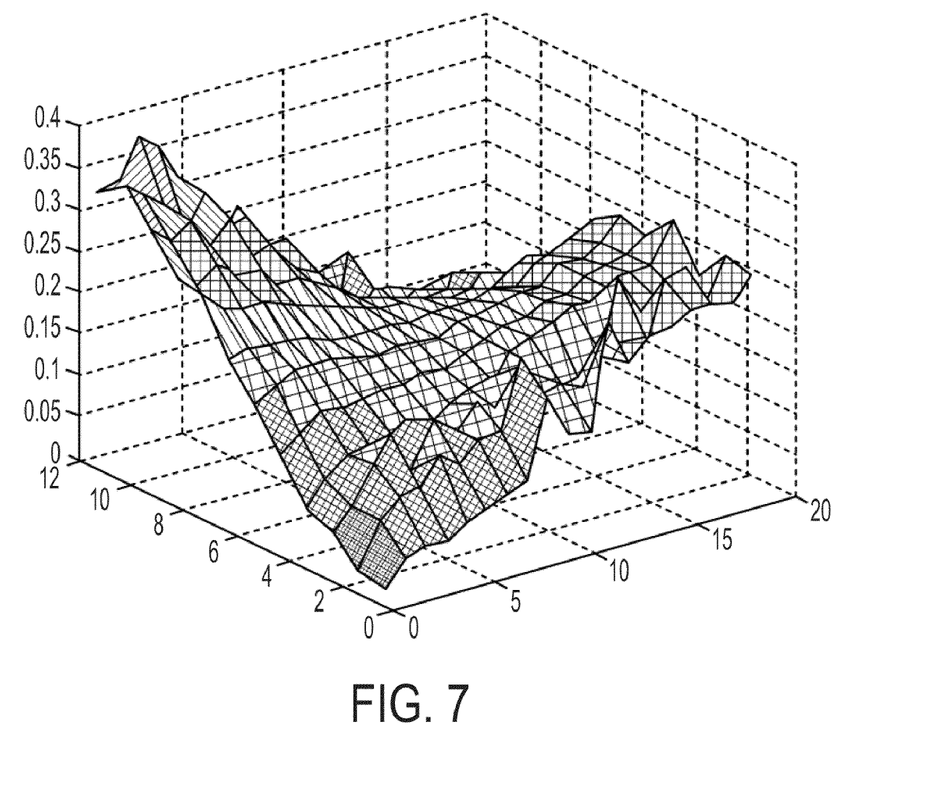
FIG. 7 is a graph of the distortion of a high image density bar printed test image where the average linear and nonlinear magnification associated with a no image test pattern is removed.

This is illustrated in FIG. 7 where a high density Bar was applied to the front of the test pattern and average linear and nonlinear error was removed based on the average error measured using no image test pattern. The resultant front to back image distortion increased by approximately 250 microns.

Figure 8:
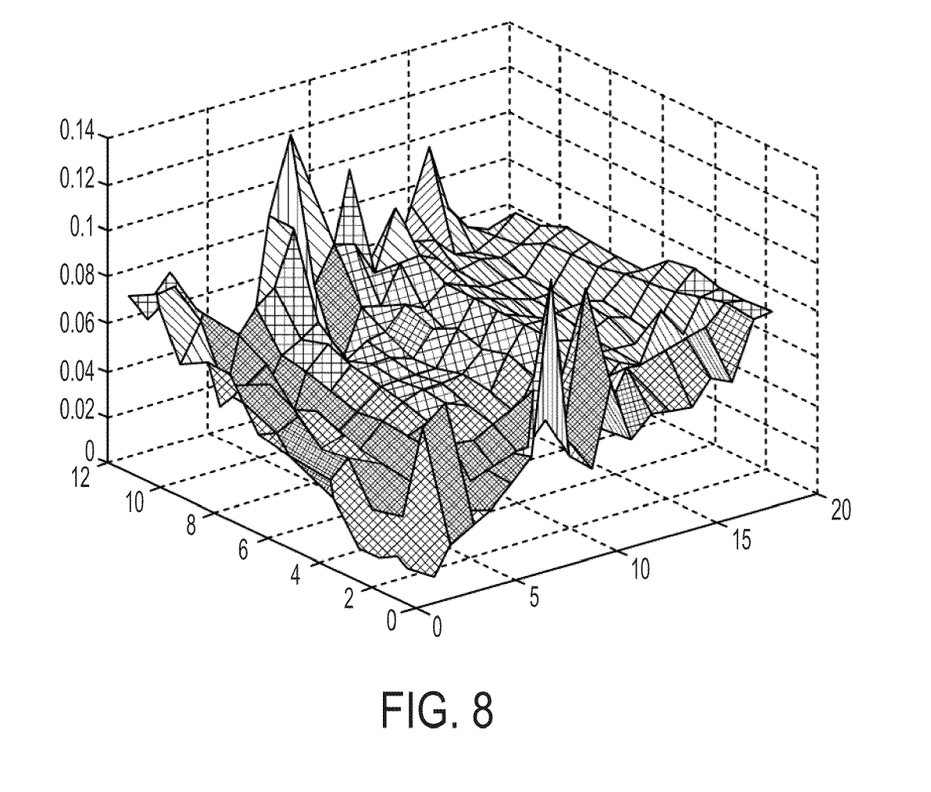
FIG. 8 is a graph of the distortion of a high image density bar printed where the average linear and nonlinear errors associated with the bar test pattern are removed.

By characterizing different media distortion changes as a function of the image density content condition and applying the disclosed embodiments to the example shown above; the image correction can be continuously modified based on each media's first side image content. Therefore, greatly improved front to back registration results can be maintained throughout the image content of the document. This is illustrated in FIG. 8 which is a plot of the high image density bar media distortion after removing average linear and nonlinear error based on the average error measured using the bar test pattern. Notable, the bar image's overall media distortion corrections are nearly as good as that achieved with very low image density.

As illustrated in FIG. 8; by applying average error correction that dynamically tracks the first side image content condition, the remaining error can remain very low. As a result, the changes in media distortion throughout the image variation in the document can remain transparent to the front to back image registration. Moreover, by applying the image compensation based on the low image density test pattern distortion parameters, as compared to compensation based on the actual image content, greater than an additional 200 microns of remaining distortion errors can be yielded.

Regarding a TIPP (Tightly Integrated Parallel Printing) system, it can be advantageous to print on a single side of a sheet of paper using more than one marking engine, a process called "overprinting". Examples of overprinting include: adding a highlight color to a color page, adding MICR to a color or monochrome page, and using a second marking engine to provide the extra colors for a 6-8 color press. The advantages that can be gained depend on the degree of registration that can be achieved between the information put onto a page (single side of a sheet of paper) by the first marking engine and all subsequent marking engines. As previously discussed, it is well known that the fusing step in xerographic printing can result in non-linear and asymmetric distortion across the page, thereby limiting the usefulness of overprinting. Moreover, the same problem exists in normal duplex where the first side is fused which results in distortion of the sheet to which the second image will be placed on the opposite side of the sheet. In fact the problem even exists for simplex, where severe distortion can result in lines that are not straight.

Heretofore, this disclosure provides exemplary embodiments to process knowledge of a toned image for a page, in conjunction with other relevant information, such as, but not limited to, machine temp, RH, fuser temp, fuser history, simplex or second side of duplex, etc. The processes guide the warping of the image data for each page so that the effects of the non-uniform distortion due to fusing can be more accurately taken into account. According to further exemplary embodiments of this disclosure, measurements are taken in situ to determine the distortion that would appear if no corrective steps were taken to eliminate/minimize the distortions due to fusing. This is done by measuring in situ: 1) the distortion of a "blank" sheet of paper where registration marks to be measured produce a very low area coverage of toner); and 2) the distortions of sheets of paper that result when a set of image content of varying amounts of percent area coverage and locations on the sheets are passed through the fuser. In addition, the further detailed descriptions explain how the geometry of a linear sensor can be calibrated to account for the imperfections in the assembly of the linear sensor module.

As previously discussed, the content of the image, rendered amounts and locations of toners that is being fused to the paper are used in conjunction with other relevant information, (machine temp, RH, fuser temp, fuser history, simplex or second side of duplex, etc) to predict better the distortion that will occur when an image is fused to the paper. Previously, it was thought that knowledge of the type of paper, its water content and the fusing conditions could be used to predict the distortion of a blank sheet of paper when the blank sheet goes through a fuser. According to this disclosure, knowledge of the distortion is used to guide the warping of the image that will be fused to the paper to cancel out the distortion that the paper will undergo as the image is fused to the paper.

While use of such a prediction will reduce the resulting distortion of the image on the paper after fusing, the differences in distortion due to the amount and location of the toners on the page will not enable the attainment of the high degree of registration required for some applications, e.g., where printing on the page by multiple marking engines can be highly advantageous, for example, in using more than 4 colors of toner to expand the color gamut with some of the added colors residing in a separate marking engine from the engine that has the usual CMYK toners.

Knowledge of how the amounts and location of toner on a page affects the distortion, when coupled with knowledge of the amounts and locations of the toner to be used on a particular page, improves the predictability of the distortion that will be introduced by the fusing step. The image content is known once the page has been RIP'd by the DFE (Digital Front End). If necessary, the changes in amounts of the various toners due to the application of, for example, the gray balance TRCs or a new color profile, can be factored into the determination of the final amounts of toner vs locations.

Once the distortions that occur without any intervention are predicted, a warping function is determined so the application of that warping function will cancel/minimize the distortions that will appear on the printed sheet. Techniques for warping of digital images to correct for pixel placement errors are well known. For example, see: U.S. Pat. No. 6,529,643 by Loce et al., entitled "SYSTEM FOR ELECTRONIC COMPENSATION OF BEAM SCAN TRAJECTORY DISTORTION."

Additional exemplary embodiments are provided to describe how a linear sensor, e.g., a CCD sensor chip coupled with reduction optics or a FWA (full width array) sensor coupled with a Selfoc lens, as commonly used in scanners for copiers, preferably in an inline configuration can be used to measure, in situ: 1) the distortion of a "blank" sheet of paper where registration marks to be measured produce a very low area coverage of toner; and 2) the distortions of sheets of paper that result when a set of image content of varying amounts of percent area coverage and locations on the sheets are passed through the fuser.

Furthermore, the geometry of the linear sensor can be measured to account for any imperfections in the assembly of the linear sensor module. The measured imperfections are then taken into account when the warping function is generated.

Figure 9A:
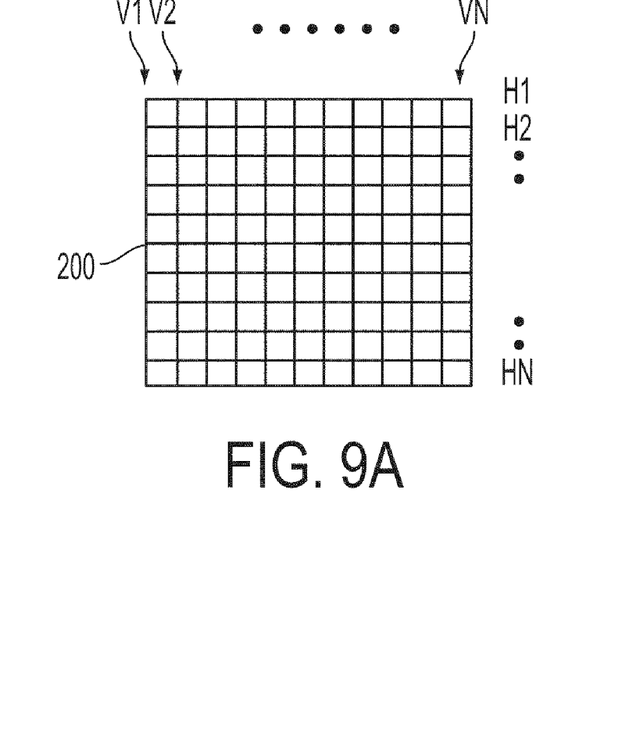
FIG. 9 illustrates the typical nonlinear distortion of a type of media due to fusing by a fuser operating at its nominal temperature.
Figure 9B:
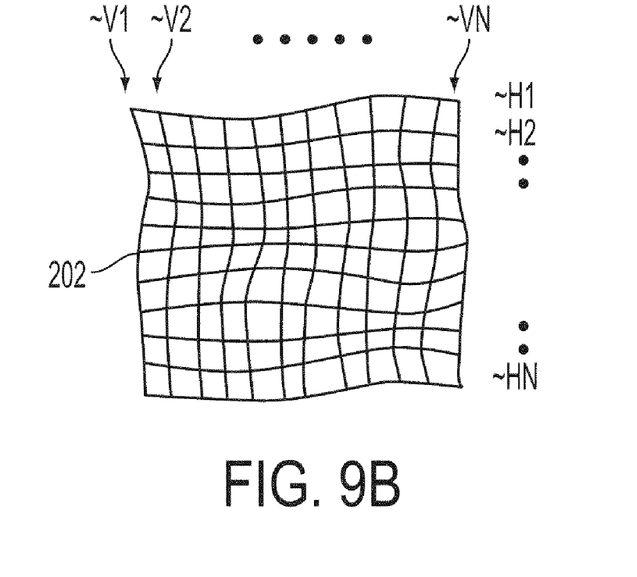

FIG. 9 is a schematic diagram showing non-linear, asymmetric distortion of a blank sheet of paper due to the fusing step. Specifically, FIG. 9 shows the typical non-linear distortions of a type of media due to fusing by operating at its nominal setting in degrees C. Plot 200 shows the contour lines of an undistorted sheet and plot 202 shows the contour lines after the sheet has been passed through a fuser. Notably, the distortion is not shown to scale and the distortion lines are conceptual only.

Figure 10A:
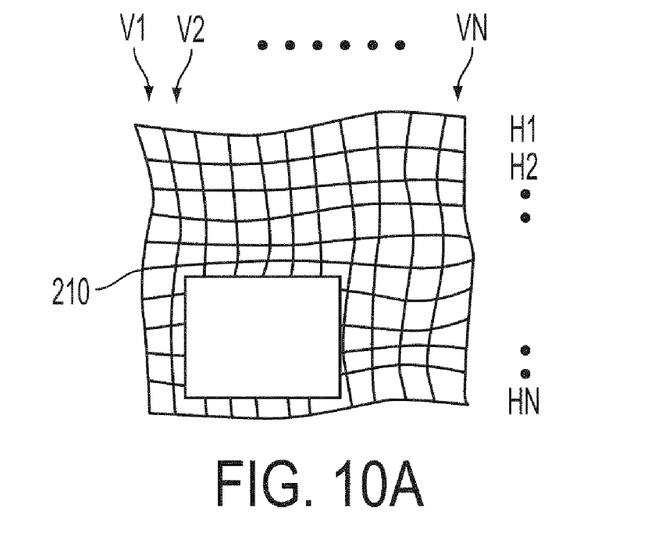
FIG. 10 illustrates the typical nonlinear distortion of a paper, as shown in FIG. 9, due to the presence of image content on the page.
Figure 10B:
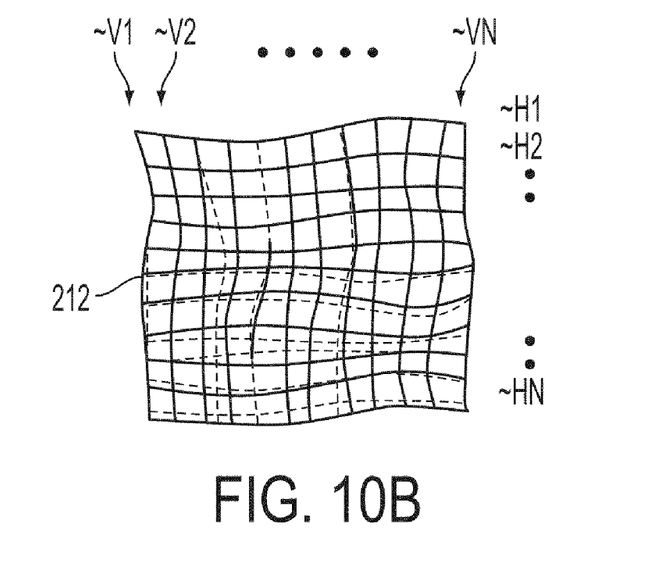

FIG. 10 is a schematic diagram of how the presence of image content on a page alters the distortion experienced by the sheet of paper after it has undergone the fusing step. Specifically, FIG. 10 shows the non-linear distortion due to the presence of image content on a page. Plot 210 shows the distortion from fusing without any image content (from FIG. 9) along with the location of where the image content will reside. In plot 212, the dotted contour lines show how the distortion in the no image situation is modified by the presence of image content on the sheet. Notably, the distortion is not to scale and the dotted lines are conceptual only.

A predictive model can utilize all relevant, available information. One approach is to use a neural network where the network is trained on: 1) blank media sheets where the registration marks used for the measurement are small enough to have a negligible effect on the distortion; and 2) toned images with various amounts of toners at various locations on the media sheets. Another approach is to determine the warp required to bring a distorted line, e.g., line ~H1 in FIG. 9, into registration with the undistorted line H1 in FIG. 9. This can be done for the entire set of distorted horizontal lines (~H1 thru ~HN) and then repeated for the entire set of vertical lines (~V1 thru ~VN). The procedure is repeated with various area coverages located in locations like that shown in FIG. 10. Here, the equations are determined that bring lines ~H1 thru ~HN and lines ~V1 thru ~VN in FIG. 10 into proper registration with their counterparts in FIG. 10.

All of the above approaches can use a LUT to provide the necessary error correction values for the respective image content. To control image content intermediate to those contained on any test patterns used for the approaches described above, an interpolation step can be incorporated into the control process. In addition, an extrapolation step can be incorporated into the control process to provide for image content outside the test patterns.

The predictive model is a two-stage process for duplex pages or for pages that are printed by more than one marking engine: 1) for the first marking step, knowledge of the image content in addition to knowledge of how the particular paper being used are used to predict the distortion of the page that will occur when the sheet is fused is used to generate the warping function that will be applied to the digital image so that the fused sheet has all straight lines; 2) knowledge of the content of the digital image to be applied in the second marking step coupled with how the second fusing step will distort the page is used to generate the warping function to be applied to the second digital image that is being printed. Typically, less of an effect is realized with the second fusing step relative to the first fusing step.

The predictive model algorithm also takes into account the current, as opposed to the nominal, operating temperature of the fuser. This is especially important when fusing both light and heavy stocks as the temperature of the fuser might be a significant distance from the nominal setting.

Figure 11:
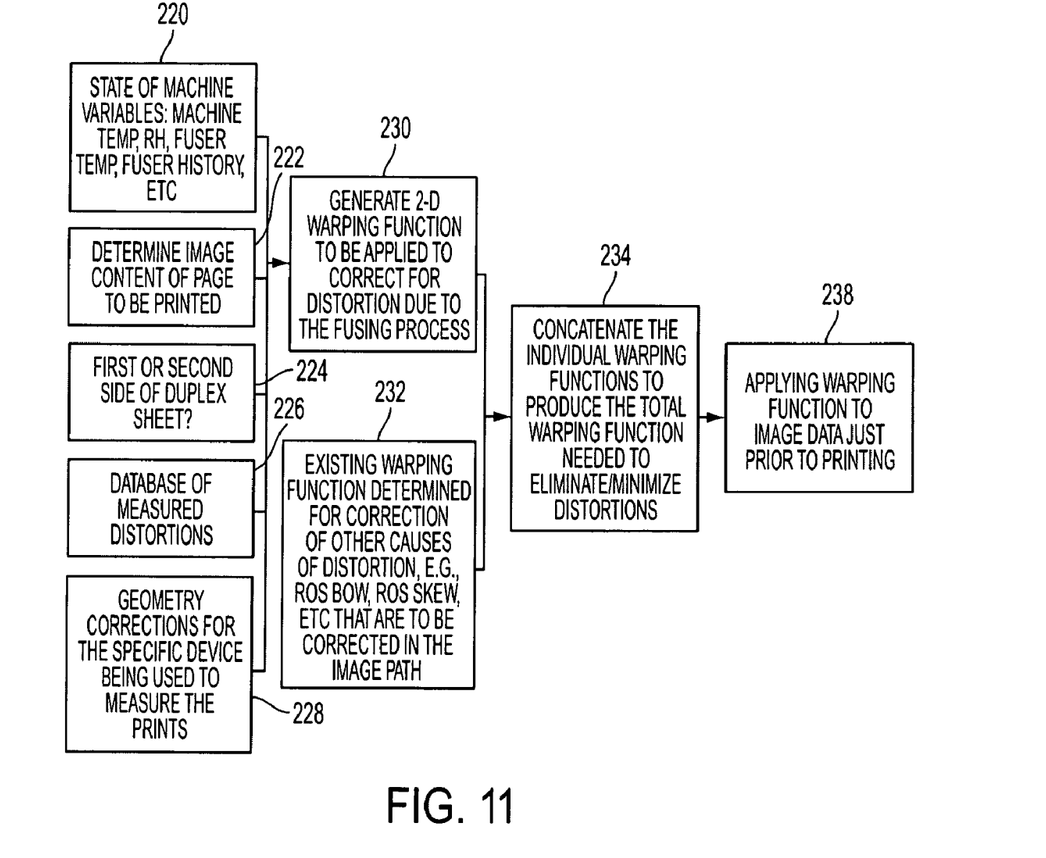
FIG. 11 is a flow chart of an exemplary method of printing an image that compensates for distortions caused by fusing toner applied to a paper sheet.

FIG. 11 shows how the information relevant to predict the distortion of a specific sheet of paper is combined to produce a 2-D warping function to be applied to the image data just prior to printing the page. Specifically, FIG. 11 shows an algorithm for the generation and application of an image-content-dependent warping function and how it is combined with other warping function(s) to produce a warping function applied to image data just prior to printing. Initially, a series of steps 220, 222, 224, 226 and 228 are performed.

Step 220 measures the state of the machine variables, for example machine temperature, RH, fuser temperature, fuser history, etc.

Step 222 determines the image content of the page to be printed.

Step 224 determines which side of a page is being printed when operating in a duplex mode.

Step 226 accesses a database of measured distortions which correlate image content and media type, as related to distortion.

Step 228 provides geometry corrections for the specific device being used to measure the prints.

Then, step 230 generates a 2-D warping function as a function of the information provided in one or more of steps 222, 224, 226 and 228. In addition, step 232 generates or accesses another warping function to correct for other causes of distortion, for example ROS bow, ROS skew, etc. that are to be corrected in the image path.

At step 234, the warping functions of 230 and 232 are concatenated to produce the total warping function needed to eliminate/minimize distortions.

Finally, at step 238, the total warping function is applied to the image data just prior to printing.

Substantively, the exemplary embodiments of methods, apparatus and systems to compensate for distortions caused by fusing operate as follows: receiving image data representing an image for printing on a printing device, the printing device including an image transfer point and a fuser; assigning a toner density value associated with printing the image on the printing device, the toner density value one of a plurality of values associated with a plurality of possible toner densities necessary to print the image on the media substrate; accessing media characterization data, the media characterization data including media shrinkage data associated with the fusing of toner for a plurality of toner density values; processing the image data according to the media characterization data for the assigned toner density value to compensate for media substrate shrinkage due to fusing the printed image on the media substrate, printing the image on the media substrate at the image transfer point using the processed image data; and fusing the printed image on the media substrate.

According to one exemplary embodiment, the media characterization data is assembled in a LUT (Look-Up Table) which includes media shrinkage correction data relative to a plurality of predetermined fuser temperatures. To acquire media correction data for fuser temperatures intermediate to the predetermined temperatures, interpolation can be used. Likewise, extrapolation can be used to acquire media correction data for fuser temperatures just outside of the predetermined temperature range.

Figure 1:
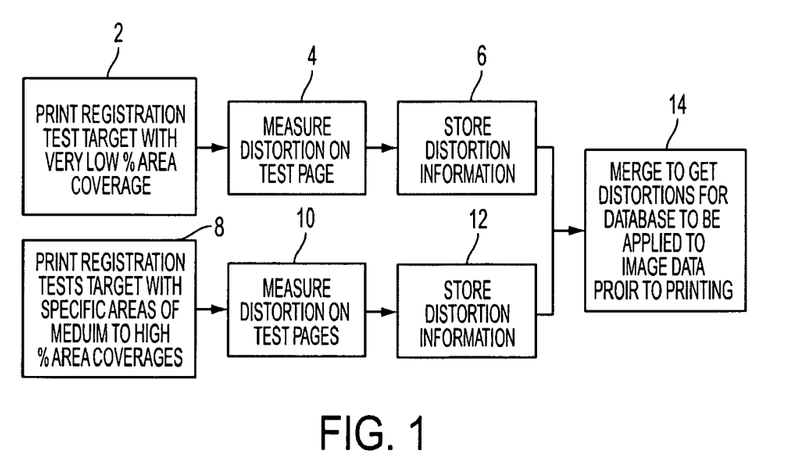
FIG. 1 is a flow chart of an exemplary method of printing an image that compensates for distortion caused by fusing toner applied to a media substrate according to this disclosure.

With reference to FIG. 1, a flow chart of an exemplary method of printing an image is shown that compensates for distortion caused by fusing toner applied to a media substrate.

Initially, at 2 print registration test targets with a very low toner % area coverage.

Next, at 4 measure the distortion on the test page.

Next, at 6 store the distortion information in a data storage device, e.g., computer, DFE, printer controller, etc.

Next, at 8 print registration test targets with specific areas of medium to high % area coverages.

Next, at 10 measure the distortion on the test pages.

Next, at 12 store the distortion information in a data storage device.

Finally, at 14 merge the stored distortion information to compile a database to be applied to image data prior to printing.

In effect, the final merged distortion information will include 1) distortion observed with nearly zero image content; and 2) distortion observed with various image contents of different area coverages and different locations on the page.

Figure 2:
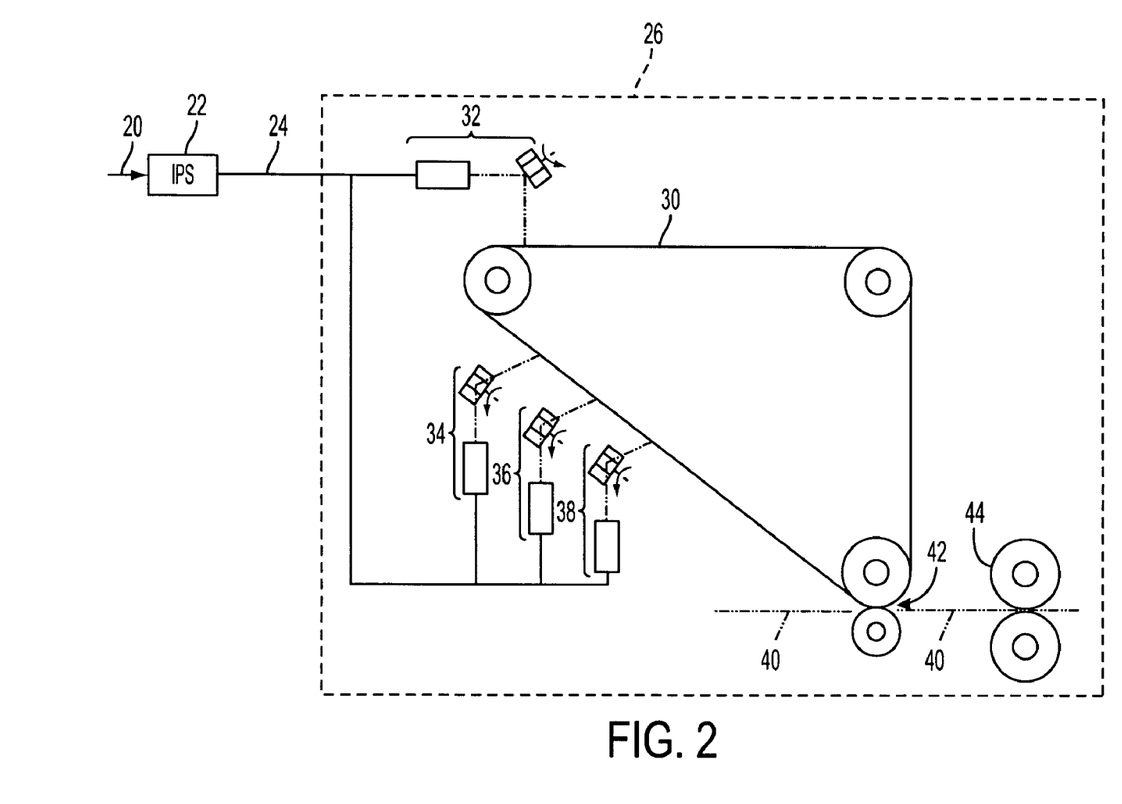
FIG. 2 is a block diagram of an exemplary embodiment of a printing system that compensates for distortion caused by fusing toner applied to a media substrate according to this disclosure.

With reference to FIG. 2, a block diagram of an exemplary embodiment of a printing system is shown that compensates for distortion caused by fusing toner applied to a media substrate.

The embodiment shown is a printing machine including a digital imaging system that incorporates the distortion compensation methods disclosed. In operation, image data 20 representing an image to be printed is received by an IPS (Image Processing System) 22 that may incorporate what is commonly referred to as DFE (Digital Front End). IPS 22 processes the received image data 20 to produce print ready binary data 24 that is supplied to a print engine 26. A media sheet 40 is routed to the image transfer point 42 and subsequently fused by fuser 44.

IPS 22 may receive image data 20 from an input scanner which captures an image from an original document, a computer, a network, or any similar or equivalent image input terminal communicating with imaging system 5. Print engine 26 is beneficially an electrophotographic engine; however, it will become evident from the following discussion that the exemplary embodiments are useful in a wide variety of copying and printing machines and is not limited in its application to the printing machine shown herein. Print engine 26 is shown as a multi-ROS engine which operates on the print ready binary data from IPS 22 to generate a color document in a single pass on a charge retentive surface in the form of photoreceptor belt 30. Briefly, the uniformly charged photoreceptor 30 is initially exposed to a light image which represents a first color image separation, such as black, at ROS 32. The resulting electrostatic latent image is then developed with black toner particles to produce a black toner image. This same image area with its black toner layer is then recharged, exposed to a light image which represents a second color separation such as yellow at ROS 34, and developed to produce a second color toner layer. IOI (image on image) process may be repeated at ROS 36 and ROS 38 to subsequently develop image layers of different colors, such as magenta and cyan.

Figure 3:
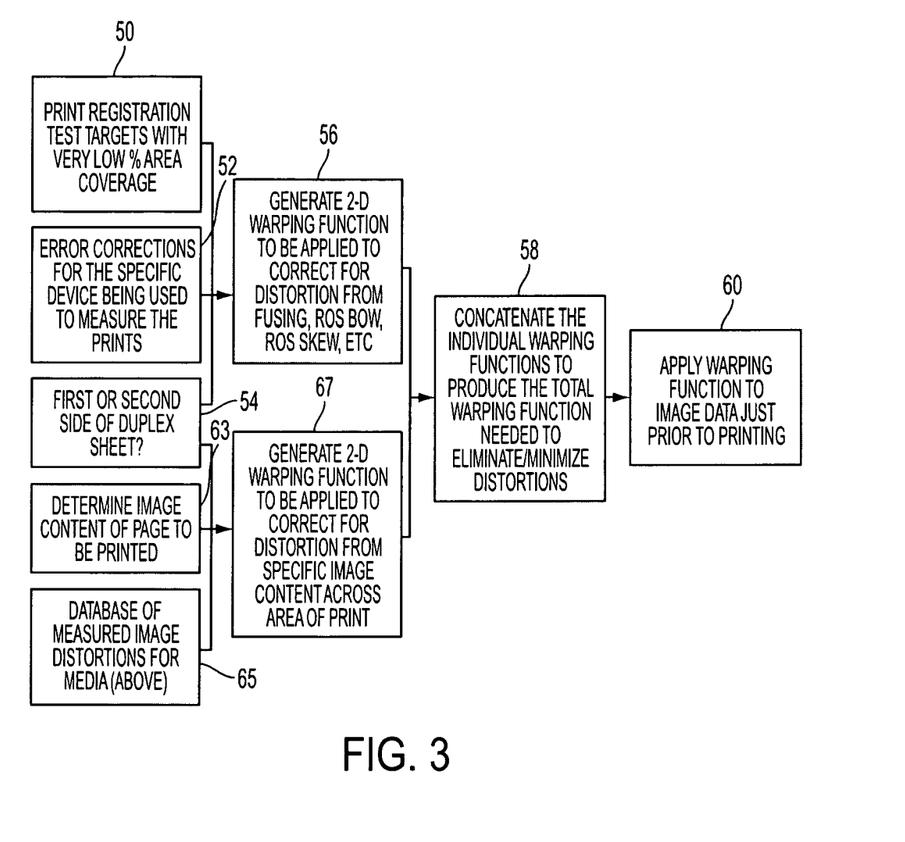
FIG. 3 is a flow chart of an exemplary method of processing an image that compensates for distortion caused by fusing toner applied to a media substrate according to this disclosure.

With reference to FIG. 3, a flow chart of an exemplary method of processing an image is shown that compensates for distortion caused by fusing toner applied to a media substrate.

Initially, at 50 the process prints registration targets with very low % area of toner coverage using an ink jet printer.

Next, at 52, generate error correction for the specific printing device being used for the measured prints.

Next, at 54 indicate which side of duplex sheet is being printed.

At 56, the process generates a 2-D warping function to be applied to the image to correct for distortion from fusing, ROS bow, ROS skew, etc.

At 67, the process generates a 2-D warping function based on the indicated duplex sheet side at 54, the image content at 63 and the database of measured image distortions for the specific media being used at 65. The 2-d warping function applied at 67 corrects for distortion for the specific image content across the area of print.

At 58, the process concatenates the individual warping functions to produce the total warping function needed to eliminate/minimize distortions.

At 60, the process applies the warping function to the image data just prior to printing.

A detailed description of the operation of a warping processor is disclosed in U.S. Pat. No. 6,529,643.

In general, the warping processor realigns the pixels in contone image into warped scanlines that compensate for distortions in the beam scan trajectory of a ROS and, according to these other distortion disclosures, caused by media distortion. For each warped pixel, a warping processor identifies the output position of the warped pixel and identifies those pixels within the contone image data that will compensate for the distortions.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of printing an image that compensates for distortions caused by fusing toner applied to a media substrate comprising:
   A) receiving image data representing an image for printing on a printing device, the printing device including an image transfer point and a fuser;
   B) assigning a toner density value associated with printing the image on the printing device, the toner density value being one of a plurality of values associated with a plurality of possible toner densities necessary to print the image on the media substrate;
   C) accessing media characterization data, the media characterization data including media shrinkage data associated with the fusing of toner for a plurality of toner density values, the media shrinkage data generated as a function of a plurality of fused toner densities associated with the plurality of toner density values;
   D) processing the image data by applying a warping function to the image data, the warping function generated as a function of the media characterization data for the assigned toner density value to compensate for media substrate shrinkage due to fusing the printed image on the media substrate;
   E) printing the image on the media substrate at the image transfer point using the processed image data; and
   F) fusing the printed image on the media substrate.

2. The method of claim 1, wherein the media characterization data includes media substrate shrinkage data associated with a plurality of media substrates at one or more fuser temperatures.

3. The method of claim 1, wherein
   step B) assigns a toner density value for each of a plurality of image areas associated with the image,
   step C) accesses media characterization data for each of the plurality of image areas associated with the image, and
   step D) processes the image data by processing the plurality of image areas according to the media characterization data for the respective assigned toner density values to compensate for media substrate shrinkage due to fusing the printed image on the media substrate.

4. The method of claim 1, wherein
   step A) includes receiving pixel image data representing the image for printing on the printing device,
   step D) includes processing the pixel image data to adjust one or more pixel values according to the media characterization data for the assigned toner density value to compensate for media substrate shrinkage due to fusing the printed image on the media substrate, and
   step E) includes printing the image on the media substrate at the image transfer point using the processed pixel image data.

5. The method of claim 1, wherein the media characterization data is assembled in a LUT (look-up-table).

6. The method of claim 5, wherein an interpolation step is applied to the media characterization data assembled in the LUT.

7. The method of claim 1, wherein the media characterization data is generated for a plurality of media substrate types which vary in composition, each media substrate type being fused at a plurality of fuser densities, and the media substrate types measured for shrinkage subsequent to fusing.

8. The method of claim 7, wherein the characterization data is generated by averaging each media substrate type shrinkage associated with the plurality of toner densities.

9. The method of claim 7, wherein the plurality of toner densities includes one or more of approximately zero toner density, approximately 25% toner density, approximately 50% toner density and approximately 100% toner density.

10. A computer program product comprising:
    a non-transitory computer-usable data carrier storing instructions that, when executed by a computer, cause the computer to perform a method of processing an image that compensates for distortion caused by fusing toner applied to a media substrate comprising:
    A) receiving image data representing an image for printing on a printing device, the printing device including an image transfer point and a fuser;
    B) assigning a toner density value associated with printing the image on the printing device, the toner density value being one of a plurality of values associated with a plurality of possible toner densities necessary to print the image on the media substrate;
    C) accessing media characterization data, the media characterization data including media shrinkage data associated with the fusing of toner for a plurality of toner density values, the media shrinkage data generated as a function of a plurality of fused toner densities associated with the plurality of toner density values; and
    D) processing the image data by applying a warping function to the image data, the warping function generated as a function of the media characterization data for the assigned toner density value to compensate for media substrate shrinkage due to fusing the printed image on the media substrate.

11. The computer program product according to claim 10, wherein the media characterization data includes media substrate shrinkage data associated with a plurality of media substrates at one or more fuser temperatures.

12. The computer program product according to claim 10, wherein
    step B) assigns a toner density value for each of a plurality of image areas associated with the image,
    step C) accesses media characterization data for each of the plurality of image areas associated with the image, and
    step D) processes the image data by processing the plurality of image areas according to the media characterization data for the respective assigned toner density values to compensate for media substrate shrinkage due to fusing the printed image on the media substrate.

13. The computer program product according to claim 10, wherein
    step A) includes receiving pixel image data representing the image for printing on the printing device, and step D) includes processing the pixel image data to adjust one or more pixel values according to the media characterization data for the assigned toner density value to compensate for media substrate shrinkage due to fusing the printed image on the media substrate.

14. The computer program product according to claim 10, wherein the media characterization data is assembled in a LUT.

15. The computer program product according to claim 14, wherein an interpolation step is applied to the media characterization data assembled in the LUT.

16. The computer program product according to claim 10, wherein the media characterization data is generated for a plurality of media substrate types which vary in composition, each media substrate type being fused at a plurality of fuser densities, and the media substrate types measured for shrinkage subsequent to fusing.

17. The computer program product according to claim 16, wherein the characterization data is generated by averaging each media substrate type shrinkage associated with the plurality of toner densities.

18. The computer program product according to claim 16, wherein the plurality of toner densities includes one or more of approximately zero toner density, approximately 25% toner density, approximately 50% toner density and approximately 100% toner density.

19. A printing system comprising:
a printing device including a fuser and an image transfer point, a controller operatively connected to the printing device, the controller configured to execute a method of printing an image that compensates for distortion caused by fusing toner applied to a media substrate comprising:
A) receiving image data representing an image for printing on the printing device,
B) assigning a toner density value associated with printing the image on the printing device, the toner density value being one of a plurality of values associated with a plurality of possible toner densities necessary to print the image on the media substrate;
C) accessing media characterization data, the media characterization data including media shrinkage data associated with the fusing of toner for a plurality of toner density values, the media shrinkage data generated as a function of a plurality of fused toner densities associated with the plurality of toner density values;
D) processing the image data by applying a warping function to the image data, the warping function generated as a function of the media characterization data for the assigned toner density value to compensate for media substrate shrinkage due to fusing the printed image on the media substrate;
E) printing the image on the media substrate at the image transfer point using the processed image data; and
F) fusing the printed image on the media substrate.

20. The printing system according to claim 19, wherein
step B) assigns a toner density value for each of a plurality of image areas associated with the image,
step C) accesses media characterization data for each of the plurality of image areas associated with the image, and
step D) processes the image data by processing the plurality of image areas according to the media characterization data for the respective assigned toner density values to compensate for media substrate shrinkage due to fusing the printed image on the media substrate.

21. The printing system according to claim 19, wherein
step A) includes receiving pixel image data representing the image for printing on the printing device,
step D) includes processing the pixel image data to adjust one or more pixel values according to the media characterization data for the assigned toner density value to compensate for media substrate shrinkage due to fusing the printed image on the media substrate, and
step E) includes printing the image on the media substrate at the image transfer point using the processed pixel image data.

22. The printing system according to claim 19, wherein the media characterization data is assembled in a LUT.

23. The printing system according to claim 22, wherein an interpolation step is applied to the media characterization data.

* * * * *